United States Patent [19]

Smith

[11] 4,103,920
[45] Aug. 1, 1978

[54] VEHICLE ANTI-ROLL MECHANISM

[76] Inventor: Roger R. Smith, 7261 Lyons Rd., Imlay City, Mich. 48444

[21] Appl. No.: 779,857

[22] Filed: Mar. 21, 1977

[51] Int. Cl. .............................................. B60G 21/06
[52] U.S. Cl. .................................. 280/112 A; 105/164
[58] Field of Search .................. 280/112 A; 105/164, 105/199 A

[56] References Cited

U.S. PATENT DOCUMENTS

| 2,703,718 | 3/1955 | Hutchinson | 280/112 A |
| 3,083,027 | 3/1963 | Lindblom | 105/164 |
| 3,868,911 | 3/1975 | Schultz | 105/164 |
| 3,977,694 | 8/1976 | Nordstrom | 105/164 |

FOREIGN PATENT DOCUMENTS 857,436  7/1939  France .................. 280/112 A

*Primary Examiner*—Robert R. Song
*Attorney, Agent, or Firm*—Peter A. Taucher; John E. McRae; Nathan Edelberg

[57] ABSTRACT

Mechanism for minimizing the tendency of a vehicle to overturn or roll during high speed turns on unbanked road or rail surfaces. The mechanism includes a heavy (high mass) piston arranged in a fluid cylinder extending transversely across the vehicle undersurface; auxiliary pistons are arranged at opposite ends of the main cylinder. Centrifugal force generated during a turning maneuver forces the main piston to move outwardly along the turning radius, the main piston thereby displacing hydraulic fluid that acts on the auxiliary pistons in a pressurizing or depressurizing fashion. The auxiliary piston at the outer circumference of the turn forces that side of the vehicle up relative to the ground surface; the auxiliary piston at the inner circumference of the turn forces that side of the vehicle down relative to the ground surface. The vehicle sprung mass thereby assumes a banked attitude that enables it to more effectively resist vehicle overturning forces.

2 Claims, 6 Drawing Figures

VEHICLE ANTI-ROLL MECHANISM

BACKGROUND AND SUMMARY OF THE INVENTION

U.S. Pat. No. 3,977,694 issued to K. T. Nordstrom discloses a vehicle anti-roll over mechanism wherein an accelerometer or other force detector operates an electric motor for a reversible hydraulic pump. The pump is arranged in a hydraulic circuit that includes one horizontally-acting fluid cylinder and two vertically-acting fluid cylinders. During a vehicle turn maneuver on an unbanked surface the accelerometer responds to centrifugal force in a transverse direction, thereby operating the pump in the direction that will cause one of the vertically-acting fluid cylinders to raise the associated area of the vehicle (at the outer side of the turn), and the other vertically-acting fluid cylinder to lower the associated area of the vehicle (at the inner side of the turn). The vehicle thus assumes a banked attitude.

The present invention is to provide a vehicle anti-roll mechanism that is somewhat simpler than prior art devices, such as that shown in U.S. Pat. No. 3,977,694. More particularly, it is desired to provide a mechanism that does not require a pump and associated pump controls. Another object is to provide a mechanism having a response force related to the centrifugal (distrubance) force; i.e. the greater the disturbance force the greater will be the counteracting response force.

The invention described herein may be manufactured, used, and licensed by or for the Government for governmental purposes without payment to me of any royalty thereon.

THE DRAWINGS

Figure 1:
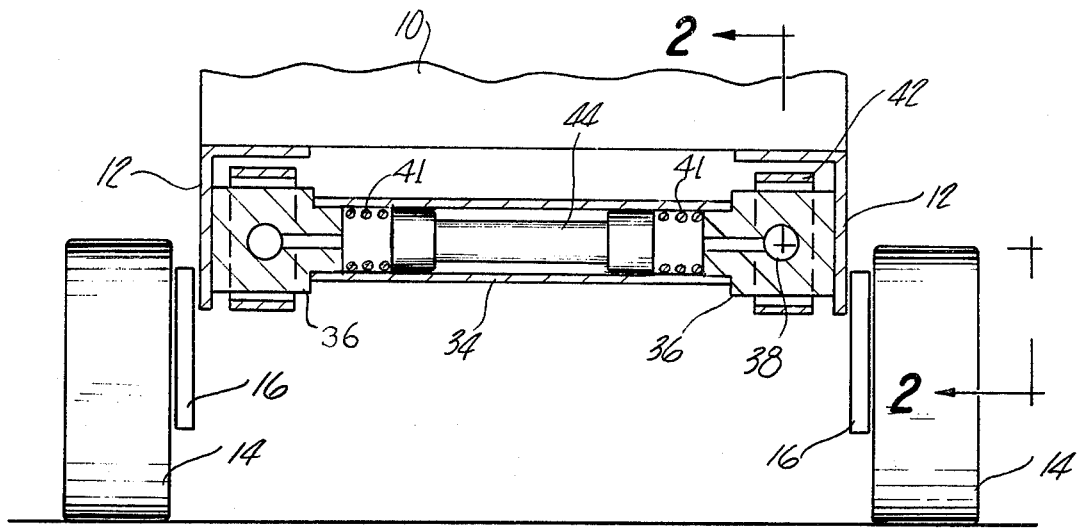
FIG. 1 is a transverse sectional view taken through a vehicle embodying this invention.
Figure 2:
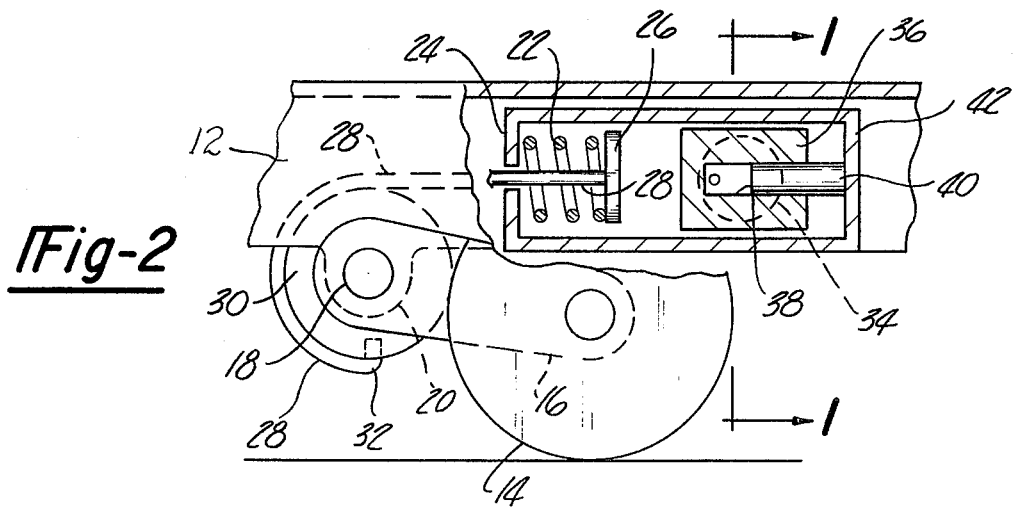
FIG. 2 is a fragmentary side elevational view of the FIG. 1 vehicle, with parts broken away on line 2—2 in FIG. 1.
Figure 3:
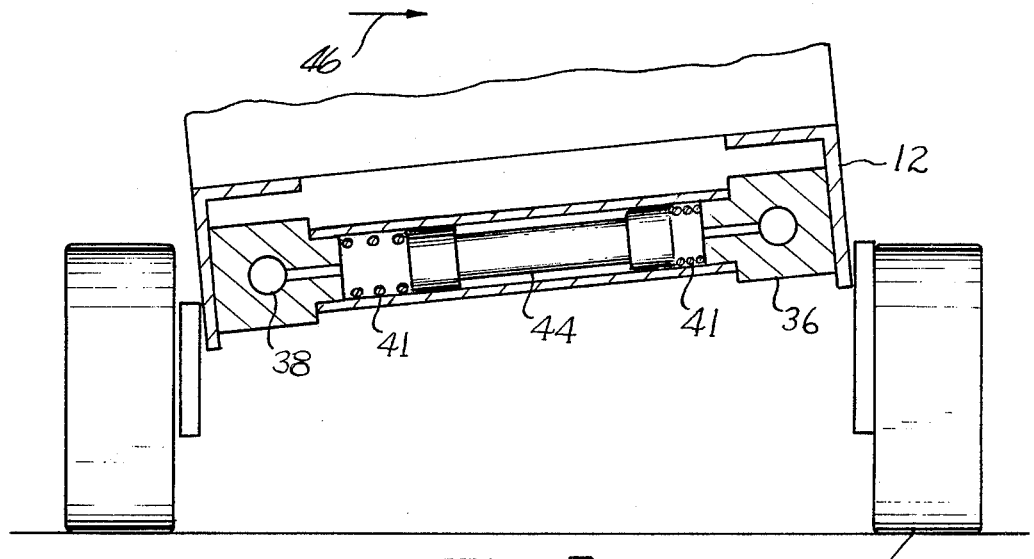
FIG. 3 is a view in the direction of FIG. 1, but illustrating the vehicle in a banked attitude during a turning maneuver.

The vehicle shown in FIGS. 1 through 3 comprises a van or flat bed cargo body 10 rigidly affixed to side rails 12. Individual roadwheels 14 are carried on road arms 16 that are pivotally mounted on rails 12 by means of stub shafts 18 extending through bearings 20 carried by the rails. The number of roadwheels is determined by the nature of the vehicle (trailer, truck or railroad car) and its load capacity.

The sprung mass, comprised of rails 12 and cargo body 10, is resiliently suspended above the roadwheels by individual coil springs 22 trained between anchorage seats 24 and 26. Anchorage 26 is connected to a cable 28 that runs over a barrel 30 to a fixed connection point 32 on the barrel surface; barrel 30 is affixed to stub shaft 18 and road arm 16. As the roadwheel oscillates around the axis of shaft 18 the cable 28 exerts a variable pulling force on seat 26. Spring 22 is thereby alternately compressed or expanded to maintain the sprung mass in a reasonably level attitude in spite of terrain irregularities.

FIG. 2 illustrates a coil spring suspension mechanism that may be used in vehicles incorporating this invention. Other suspension mechanisms such as air bags, torsion bars or leaf springs, could also be used. The invention is particularly concerned with mechanism that is responsive to centrifugal force for adjusting the locations of spring seats 24 carried by the sprung mass, to thereby vary the ground clearance (cargo bed elevation) at opposite side areas of the vehicle, as shown in FIG. 3.

The illustrated force-responsive means comprises a main fluid cylinder 34 extending transversely across the undersurface of the vehicle. Each end of the cylinder is closed by a plug-like casting 36 that is suitably affixed to an associated rail 12. A bore 38 is machined into each casting 36 at right angles to main cylinder 34; each casting constitutes a cylinder for an auxiliary piston 40, whose outer end abuts against a strap or frame 42 connected to spring seat 24. It will be seen from FIG. 2 that movement of piston 40 to the right enables strap 42 to move spring seat 24 to the right, thereby increasing the load on spring 22 and causing spring seat 26 to pull cable 28 in the direction that will produce clockwise motion of barrel 30 and roadarm 16; this action elevates the sprung mass relative to the ground surface. Still referring to FIG. 2, movement of piston 40 to the left displaces seat 24 to the left, thereby relaxing the spring load and producing counterclockwise motion of barrel 30 and roadarm 16; this action lowers the sprung mass relative to the ground surface.

The motive force for retracting or extending each auxiliary piston 40 relative to its cylinder 36 is provided by a main piston 44 that is floatably positioned within cylinder 34 in a central position equidistant from rails 12. The cylinder spaces between piston 44 and each auxiliary piston 40 are completely filled with force-transmitting fluids, preferably hydraulic fluids of substantially incompressible character. Piston 44 is formed of steel or other high density material; also the piston is made to have appreciable size (diameter and length) for satisfactory action on the force-transmitting liquids during a vehicle turn maneuver.

FIG. 1 illustrates the vehicle when travelling straight ahead. Piston 44 occupies a central position within cylinder 34. Each spring 22 exerts a force on seat 24 that is translated into a pressure on the outer (right) end of the associated piston 40. The spring forces on opposite sides of the vehicle are equalized by the hydraulic system comprised of auxiliary pistons 40, the hydraulic fluids, and main piston 44. Light coil springs 41 act as piston-centering devices when the vehicle is in a static parked condition; these centering springs tend to prevent the hydraulic fluids from leaking past the main piston when the hydraulic forces are unbalanced, as when the vehicle is parked on a side slope. When the vehicle is in motion springs 41 have no major effect on the vehicle attitude.

FIG. 3 illustrates in an exaggerated fashion the cargo-body banking action that occurs during a left turn. During such a turn the generated centrifugal force, designated by numeral 46, tends to overturn the vehicle cargo body about the ground-roadwheel contact point 48 at the right roadwheel; this overturn tendency has an adverse effect on vehicle stability and handling characteristics, particularly the ability to steer the vehicle through the turn. Under the present invention the floating piston 44 is oriented transversely in the plane of the centrifugal disturbance force. Accordingly, the disturbance force displaces the main piston to the right (in the case of a left turn). The auxiliary piston 40 at the right side of the vehicle is thus extended from its cylinder 36 to thereby elevate the right side of the vehicle; concurrently the other auxiliary piston is retracted into its cylinder 36 to thereby lower the left side of the vehicle. The vehicle thus assumes a banked condition more resistant to roll-over action than a non-banked vehicle.

The structure of FIGS. 1 through 3 is believed to be advantageous in that it is a relatively simple rugged design having a minimum number of moving parts or controls. Also, the structure is believed to have a good (short) time response to the disturbance force 46 because there are no pumps or intervening control instrumentalities between the force detector and the counteracting force mechanism. In the system of FIG. 1 the detector and counteracting force means are embodied in the same element, namely piston 44. It is additionally believed that the FIG. 1 structure has an advantageous "response proportionality" mode of operation, wherein the magnitude of the counteracting force is proportioned to the magnitude of the disturbance force. Thus, the extent of vehicle banking will be greater at high speed than at low speed, as required for optimum control. A disadvantage of the FIG. 1 structure is the weight penalty imposed by piston 44.

Figure 4:
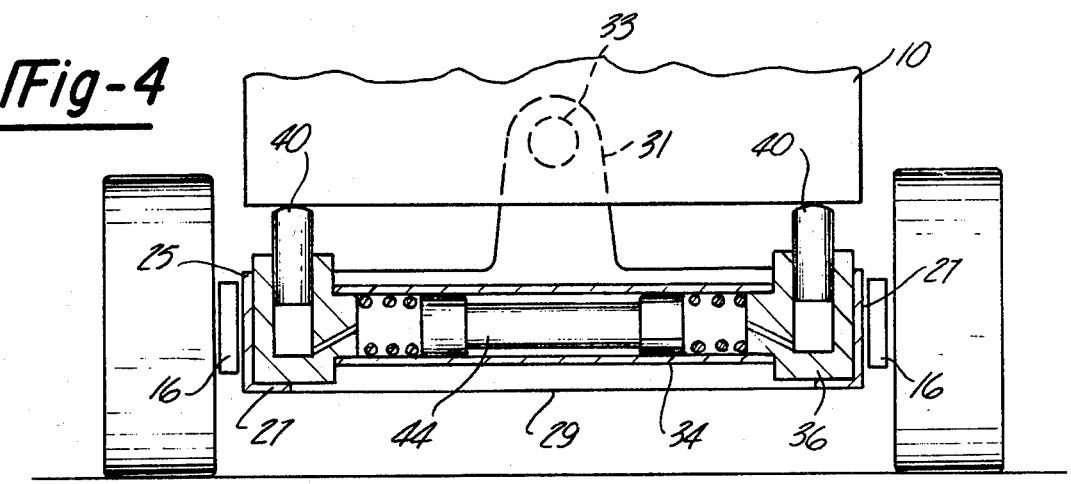
FIG. 4 is a transverse sectional view taken through a second vehicle embodying the invention.
Figure 5:
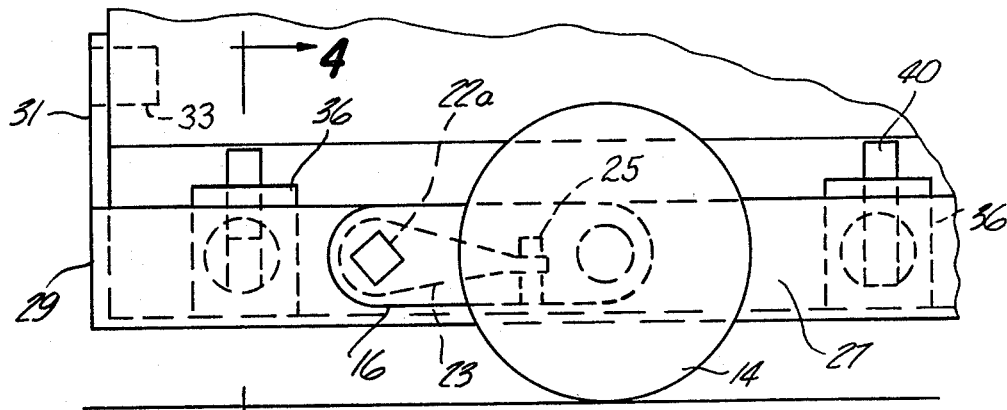
FIG. 5 is a fragmentary side elevational view of the FIG. 4 vehicle.
Figure 6:
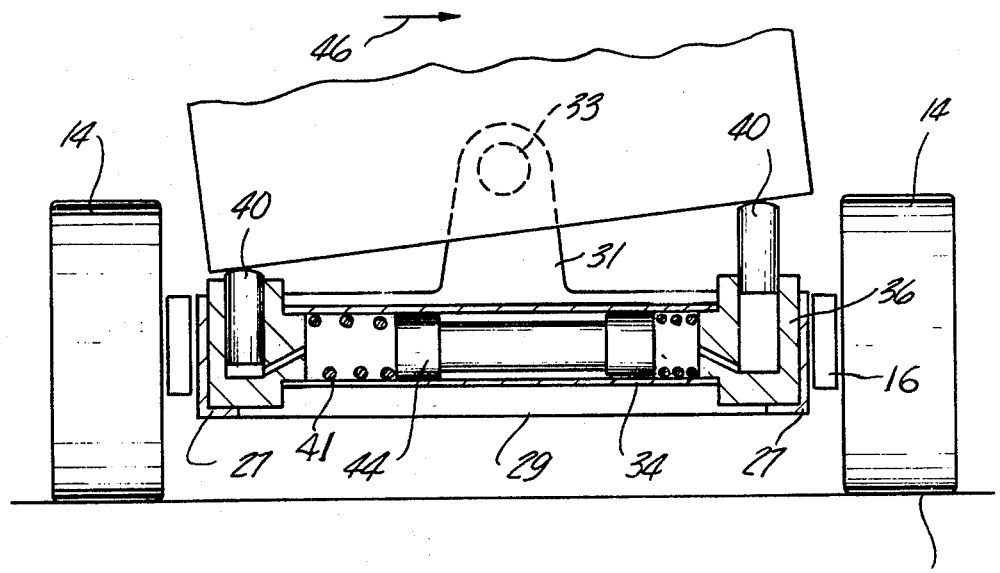
FIG. 6 is a view similar to FIG. 4, but illustrating the vehicle in a banked attitude.

FIGS. 4 through 6 illustrate a system that is in many respects similar to the system of FIGS. 1 through 3; hence similar reference numerals are used for similar components. In the FIG. 4 vehicle each roadarm 16 is connected to a transversely-extending torsion bar 22a whose inner end is connected to a lever type anchorage 23 carried by a frame structure 25. Structure 25 includes side rails 27 and end rails 29. During overland movement of the vehicle the torsion bar is resiliently stressed to maintain frame 25 in a reasonably stable attitude in spite of terrain irregularities.

In the vehicle of FIG. 4 the carbon body 10 is pivotally mounted on frame 25 for tilting movement in a side-to-side direction. The pivot mechanism comprises an upstanding wall-like extension 31 on each end rail 29 and a pivot pin 33 located in the central longitudinal plane of the vehicle.

FIG. 4 illustrates the attitude of the vehicle during straight-ahead movement. Side areas of cargo body 10 exert vertical forces on the subjacent pistons 40. The pistons transmit such forces to the hydraulic fluids within cylinder 34; main piston 44 assumes a central position equidistant from the side rails 27. If the load is substantially even or balanced from one side of the cargo body to the other there will be little or no side-to-side tilt of the cargo body. Normal terrain irregularities will cause the individual roadwheels 14 to move up and down relative to frame 25 and cargo body 10, as determined by the torsional deflection characteristic of torsion bars 22a.

FIG. 6 illustrates the attitude of the cargo body during a left turn. Centrifugal force 46 displaces piston 44 to the right, thereby pressurizing the cylinder space below the rightmost piston 40 and depressurizing the cylinder space below the leftmost piston 40. The vehicle thus assumes a banked condition. The arrangement of FIG. 6 will probably not operate as effectively as the arrangement of FIG. 3 because centrifugal force 46 generates an undesired force couple around the pivot axis 33; this force couple causes the cargo body 10 to exert a larger downward force on the right pistons 40 than on the left pistons 40. However, it is believed that if main piston 44 is designed to have sufficient mass the upward hydraulic force on the right pistons 40 will overcome the load force and thereby put the cargo body in a banked condition, as shown in FIG. 6. The extent of the bank will be proportional to the speed of the vehicle and the tightness of the turn (i.e. inversely to the turn radius of curvature).

The drawings show two different embodiments of the invention. Some variations to adapt the invention to different types of vehicle suspension will become apparent. The features of the invention are recited in the appended claims. I wish it to be understood that I do not desire to be limited to the exact details of construction shown and described for obvious modifications will occur to a person skilled in the art.

I claim:

1. In a cargo-carrying road vehicle comprising a cargo body, roadwheels for the cargo body, and resilient suspension means operably connecting the cargo body to the roadwheels: the improvement comprising anti-roll means interposed between the cargo body and each resilient suspension means; said anti-roll means comprising a main hydraulic cylinder extending transversely across the undersurface of the cargo body, a main piston of appreciable mass slidably positioned within the cylinder for inertial movement in either direction from a normal position substantially equidistant from the cargo body sides, second and third auxiliary cylinders extending right angularly from the main cylinder at its opposite ends, second and third auxiliary pistons slidably disposed in respective ones of the auxiliary cylinders, force-transmitting hydraulic liquids filling the cylinders whereby movement of the main piston from its normal position in a given direction extends one auxiliary piston relative to its cylinder and retracts the other auxiliary piston relative to its cylinder; the main piston having sufficient mass so that when the vehicle is steered through a turn the resultant centrifugal force will move the main piston radially away from the turn axis, said main piston thereby causing the associated liquids to pressurize the auxiliary piston at the outer turn circumference and de-pressurize the auxiliary piston at the inner turn circumference; each resilient suspension comprising a first anchorage (26) operatively connected to a roadwheel, a second anchorage (24) operatively connected to an auxiliary piston, and a spring (22) trained between said anchorages, whereby extension or retraction of the auxiliary piston repositions the associated anchorage (24) for thereby raising or lowering the adjacent portion of the cargo body.

2. The improvement of claim 1 wherein each spring (22) is a compressed coil spring having its axis oriented horizontally and parallel to the longitudinal axis of the vehicle.

* * * * *